US007058885B1

(12) United States Patent
Thormodsen et al.

(10) Patent No.: US 7,058,885 B1
(45) Date of Patent: Jun. 6, 2006

(54) PICTURE BOOK TEMPLATE AND SYSTEM AND METHOD FOR CREATING THE SAME

(75) Inventors: Arne D. Thormodsen, Corvallis, OR (US); Phyllis A. Ellendman, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1038 days.

(21) Appl. No.: 09/721,027

(22) Filed: Nov. 21, 2000

(51) Int. Cl.
*G06F 15/00* (2006.01)

(52) U.S. Cl. ........................................ 715/517; 715/500

(58) Field of Classification Search ................ 715/530, 715/517, 500; 345/619, 660; 283/106, 99
See application file for complete search history.

(56) References Cited

U.S. PATENT DOCUMENTS

| | | | | |
|---|---|---|---|---|
| 4,524,993 | A | 6/1985 | Walker-Taylor | |
| 4,856,818 | A | 8/1989 | Rabenecker et al. | |
| 5,057,070 | A | 10/1991 | Pidcock | |
| 5,517,621 | A * | 5/1996 | Fukui et al. | 715/517 |
| 5,706,457 | A * | 1/1998 | Dwyer et al. | 345/835 |
| 5,966,455 | A * | 10/1999 | Saito | 382/112 |
| 6,134,565 | A * | 10/2000 | Hommersom et al. | 715/517 |
| 6,202,061 | B1 * | 3/2001 | Khosla et al. | 707/3 |
| 6,229,502 | B1 * | 5/2001 | Schwab | 345/1.1 |
| 6,327,599 | B1 * | 12/2001 | Warmus et al. | 715/517 |
| 6,338,076 | B1 * | 1/2002 | Hidding et al. | 715/530 |
| 6,366,918 | B1 * | 4/2002 | Guttman et al. | 707/100 |
| 6,446,100 | B1 * | 9/2002 | Warmus et al. | 715/517 |
| 6,522,418 | B1 * | 2/2003 | Yokomizo et al. | 358/1.15 |
| 6,596,032 | B1 * | 7/2003 | Nojima et al. | 715/517 |
| 6,919,910 | B1 * | 7/2005 | Chang | 345/635 |

FOREIGN PATENT DOCUMENTS

| | | |
|---|---|---|
| JP | 09165045 | 6/1997 |
| JP | 2000148744 | 5/2000 |

OTHER PUBLICATIONS

Anonynous, Using paper wisely, Step—By—Step Graphics, Dec. 1998, vol. 14, p. 23.*

Davey, Do-it-yourself printing, Informationweek, Jun. 8, 1998, Iss. 685, p. 138.*

Hanna, Writer worksheets: a layout workship, Feb. 1995, vol. 42, p. 183.*

(Continued)

*Primary Examiner*—Cong-Lac Huynh

(57) ABSTRACT

Disclosed are a picture book template and a system and a method for making the same. The picture book template includes a picture book cutout that is cut and folded according to directions to create a picture book. The picture book cutout has a number of pages. The pages are defined by a number of identifier lines. The picture book template also includes a region that includes assembly instructions with a graphical depiction of an assembly of the picture book from the picture book cutout. The graphical depiction shows the identifier lines to aid in the assembly of the picture book. There is a correspondence between respective identifier lines in the picture book cutout and in the graphical depiction. The correspondence is indicated, for example, by creating the corresponding identifier lines with a predefined color or type of line.

14 Claims, 8 Drawing Sheets

OTHER PUBLICATIONS

Demaine, Folding Flat Sihouettes and Wrapping Polyhedral Packages: New Results in Computational Origami, ACM 1999, pp. 105-114.*

Make a Paper Bag Book; [online] Available: http:www.arts.ufl.edu/art/rt__room/sparkers/artist__book/make__a__book.html [Oct. 25, 2000].

"Inbooklet Manual"; First Published Jun. 2000: ftp://ftp:alap.com/pub/InDesign/InBooklet__Documentation.pdf; 12 pages.

"Using Type" Palm Size Press; 1998; http://www.adobe.com/print/features/palmsize/pdfs/type1.pdf; 2 pages.

* cited by examiner

PICTURE BOOK TEMPLATE AND SYSTEM AND METHOD FOR CREATING THE SAME

TECHNICAL FIELD

The present invention is generally related to the field of printing and, more particularly, is related to a picture book template and a system and method for creating the same.

BACKGROUND OF THE INVENTION

People often wish to keep pictures with them for various reasons. For example, many wish to keep pictures of family members with them so that they can be reminded of their family when they are apart. Others may wish to have pictures for other reasons. Sales persons may wish to provide pictures of products in a compact format. For example, real estate brokers may wish to provide a series of pictures of real estate in a compact format that prospective buyers may view.

Currently, more and more pictures are available in digital format. With the advent of digital cameras, many people no longer choose to memorialize their pictures on film. Instead, the images and accompanying text may be viewed on a screen or printed out on paper. Sometimes, it is desirable to print such images and text in the form of a picture book. Unfortunately, it can take significant effort to create a simple and attractive picture book due to the complexities regarding formatting and other considerations.

SUMMARY OF THE INVENTION

In light of the forgoing, the present invention provides for a picture book template and a system and method for making the same. The picture book template includes a picture book cutout that is cut and folded according to directions to create a picture book. The picture book cutout has a number of pages. The pages are defined by a number of identifier lines. The picture book template also includes a region that details assembly instruction with a graphical depiction of an assembly of the picture book from the picture book cutout. The graphical depiction shows the identifier lines to aid in the assembly of the picture book. There is a correspondence between respective identifier lines in the picture book cutout and the graphical depiction as indicated, for example, with a predefined color or type of line.

The present invention may also be viewed as a system to create a digital picture book template. In this regard, the system includes a processor circuit having a processor and a memory. The system also includes book assembly logic stored in the memory and executable by the processor. The book assembly logic further comprises logic to obtain a number of content items to be depicted in a picture book cutout in the digital picture book template, logic to define a number of pages of the picture book cutout with a number of indicator lines, logic to associate at least one of the content items with at least one of the pages, and logic to associate a set of assembly instructions with the digital picture book template.

In addition, the present invention may also be viewed as a method for creating a digital picture book template in a server. The present method comprises the steps of: obtaining a number of content items in a server to be depicted in a picture book cutout in the digital picture book template, defining a number of pages of the picture book cutout in the server with a number of indicator lines, associating at least one of the content items with at least one of the pages, and associating a set of assembly instructions with the digital picture book template.

Other features and advantages of the present invention will become apparent to a person with ordinary skill in the art in view of the following drawings and detailed description. It is intended that all such additional features and advantages be included herein within the scope of the present invention.

BRIEF DESCRIPTION OF THE SEVERAL VIEWS OF THE DRAWINGS

The invention can be understood with reference to the following drawings. The components in the drawings are not necessarily to scale. Also, in the drawings, like reference numerals designate corresponding parts throughout the several views.

DETAILED DESCRIPTION OF THE INVENTION

Figure 1:
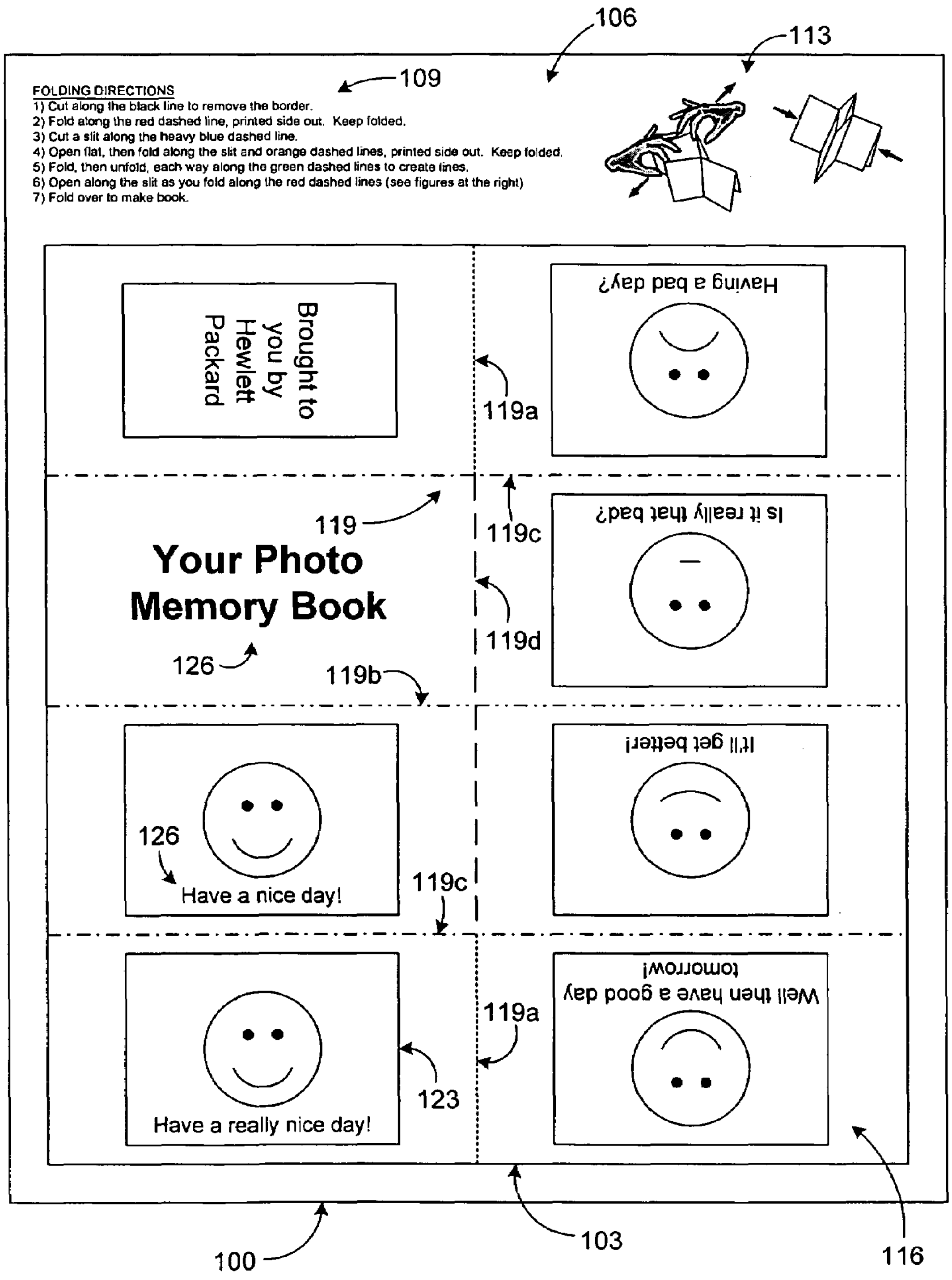
FIG. 1 is a drawing of a picture book template according to an embodiment of the present invention.

With reference to FIG. 1, shown is a picture book template 100 according to an embodiment of the present invention. The picture book template 100 includes a picture book cutout 103 and an instructions region 106. The instructions region 106 includes instructions 109 and a graphical depiction 113 of the assembly of a picture book from the picture book cutout 103. The picture book cutout 103 includes a number of pages 116. The pages are defined by a number of identifier lines 119. The pages 116 that are defined by the identifier lines 119 ultimately become the pages of a picture book that is assembled from the picture book cutout 103 pursuant to the instructions 109 and in light of the graphical depiction 113. One or more of the pages 116 can include an image 123 and text 126, or a combination of an image 123 and text 126, etc. Also, multiple images 123 and/or blocks of text 126 may be included within a specific page 116.

The identifier lines 119 differ from each other in appearance depending on their placement in the picture book cutout 103. The identifier lines 119 as shown generally correspond to the same identifier lines 119 as depicted in the graphical depiction 113 to aid in the assembly of the resulting picture book. In this respect, the identifier lines 119 may be color-coordinated, for example, to allow a user to more readily identify the procedure for assembling the resulting picture book. For example, the identifier lines 119 may include one or more orange identifier lines 119*a*, a red identifier line 119*b*, green identifier lines 119*c* and a blue identifier line 119*d*. Note that other color arrangements may be employed that correspond with the color statements in the instructions 109.

Figure 2:
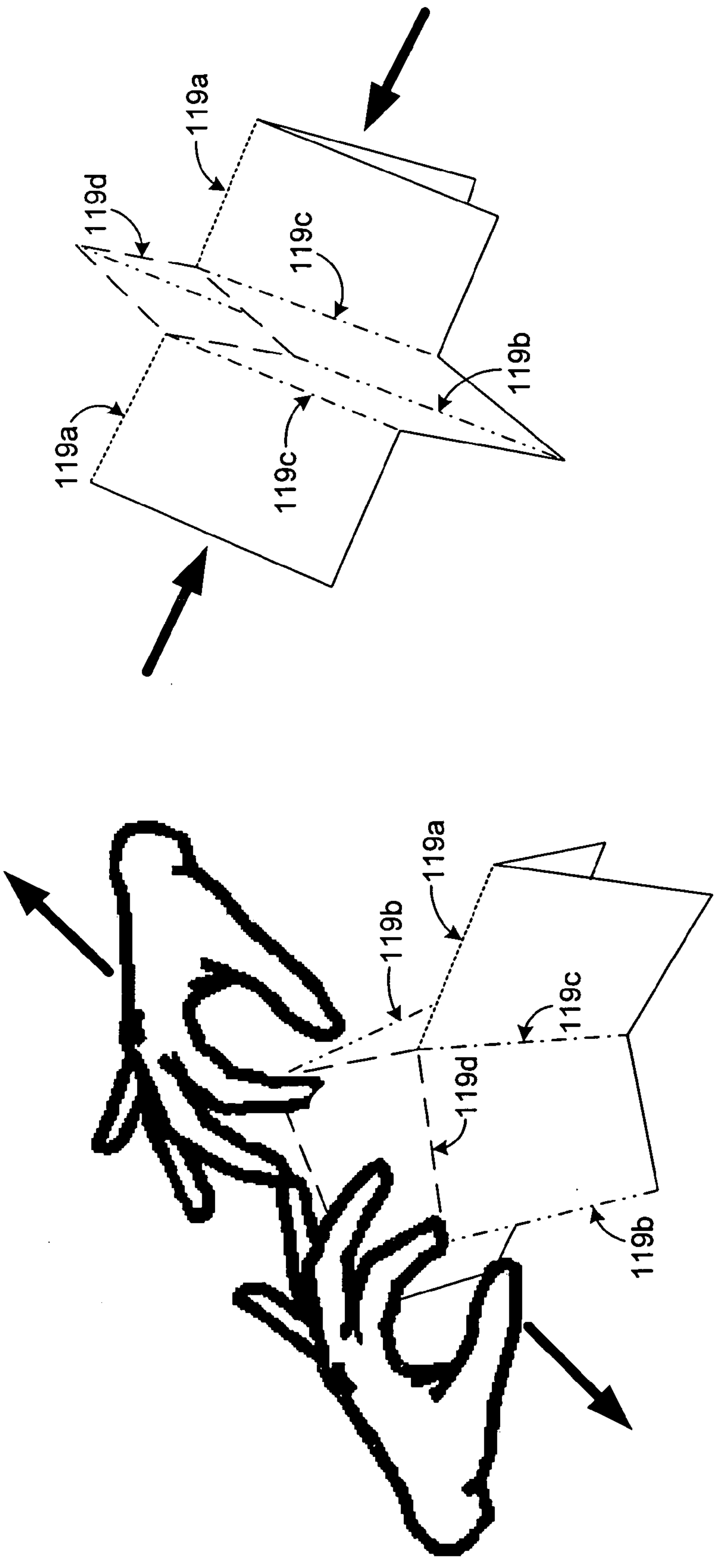
FIG. 2 is a drawing of a graphical depiction of an assembly of a picture book from a picture book cutout in the picture book template of FIG. 1.

Turning then to FIG. 2, shown is a further illustration of the graphical depiction 113 according to an aspect of the present invention. As shown, the graphical depiction 113 includes the identifier lines 119*a*, 119*b*, 119*c*, and 119*d* in relation to their assembled positions to aid the user in understanding the overall assembly of the picture book from the picture book cutout 103 (FIG. 1).

Figure 3:
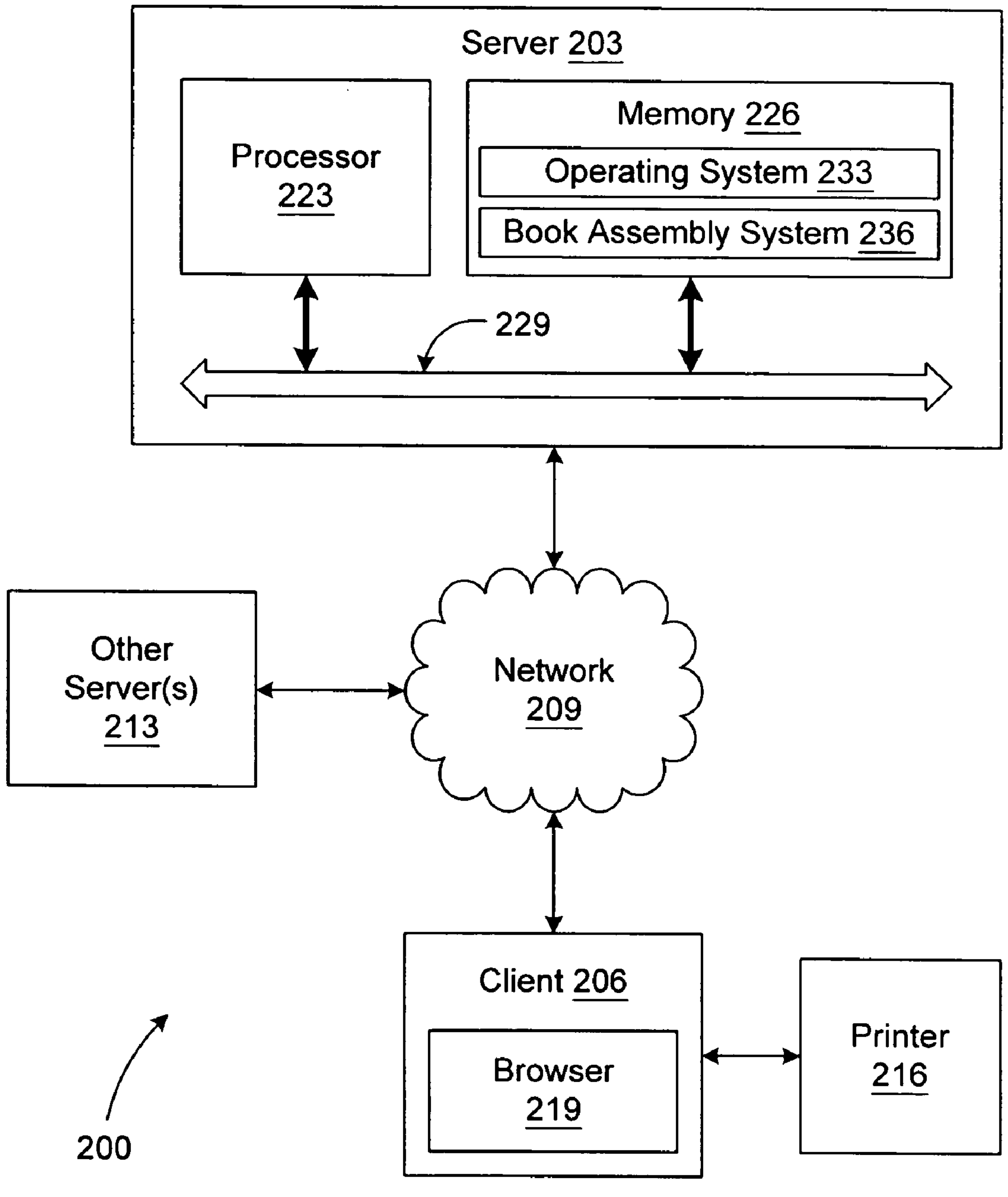
FIG. 3 is a block diagram of a picture book assembly network to create a digital version of the picture book template of FIG. 1.

With reference to FIG. 3, shown is a picture book assembly network 200 according to an embodiment of the present invention. The picture book assembly network 200 provides a means by which the picture book template 100 (FIG. 1) may be created as will be discussed. The picture book assembly network 200 includes a server 203, a client 206, and a network 209. The server 203 and the client 206 are both coupled to the network 209 to facilitate data communications therebetween. Also, other servers 213 may be linked to the network 209 as is generally known by those with ordinary skill in the art. A printer 216 is coupled to the client 206 to enable the user to print out documents from the client 206. Running on the client 206 is a browser 219 that provides access to various web sites and web pages located on the server 203 and the other servers 213, etc. The client 206 may comprise, for example, a computer system or other such system that are generally known by those with ordinary skill in the art.

The server 203 may be, for example, a computer system or other system that includes a processor 223 and a memory 226, both of which are coupled to a local interface 229. The local interface 229 may comprise, for example, a data bus with an accompanying control bus as is generally known by those with ordinary skill in the art. Stored in the memory 226 and executable by the processor 223 is an operating system 233 and a book assembly system 236. The operating system 223 is executed by the processor 223 to perform the basic operating functionality of the server 203 as is generally known by those with ordinary skill in the art. The book assembly system 236 is executed by the processor 223 to interface with the client 206 via the browser 219 to assemble a picture book template 100 (FIG. 1) as was discussed with reference to FIG. 1. Once the picture book template 100 is assembled in digital form on the server 203, it is transmitted to the client 206 and viewed through the browser 219 or other application. A particular user of the client 206 can then print out the picture book template 100 onto paper or other material via the printer 216.

The network 209 may be, for example, the Internet, wide area networks (WANs), local area networks, or other suitable networks, etc., or any combination of two or more such networks. The server 203, client 206, the other servers 213 are coupled to the network 209 to facilitate data communication with other devices through the network 209 in any one of a number of ways that are generally known by those of ordinary skill in the art. For example, the server 203 or client 206 may be linked to the network 209 through various devices such as, for example, network cards, modems, or other such communications devices. Also, the server 203 or client 206 may be coupled to the network 209 through a local area network and an appropriate network gateway or other arrangements, etc.

The memory 226 may include both volatile and nonvolatile memory components. Volatile components are those that do not retain data values upon loss of power. Nonvolatile components are those that retain data upon a loss of power. Thus, the memory 226 may comprise, for example, random access memory (RAM), read-only memory (ROM), hard disk drives, floppy disks accessed via an associated floppy disk drive, compact disks accessed via a compact disk drive, magnetic tapes accessed via an appropriate tape drive, and/or other memory components, or a combination of any two or more of these memory components.

In addition, the processor 223 may represent multiple processors and the memory 226 may represent multiple memories that operate in parallel. In such a case, the local interface 229 may be an appropriate network that facilitates communication between any two of the multiple processors or between any processor and any of the memories, etc. The local interface 229 may facilitate memory to memory communication as well. The processor 223, memory 226, and local interface 229 may be electrical or optical in nature. Also, the memory 226 may be magnetic in nature as discussed above.

Also, the server 203, client 206, and the other servers 213 may include input devices such as, for example, a keypad, touch pad, touch screen, microphone, scanner, mouse, joystick, or one or more push buttons, etc. User output devices may include display devices, indicator lights, speakers, printers, etc. Specific display devices may be, for example, cathode ray tubes (CRT), a liquid crystal display screens, a gas plasma-based flat panel displays, light emitting diodes, or other display devices. For example, the client 206 includes a display device that is employed to display the browser 219 that is manipulated by a user.

Figure 4:
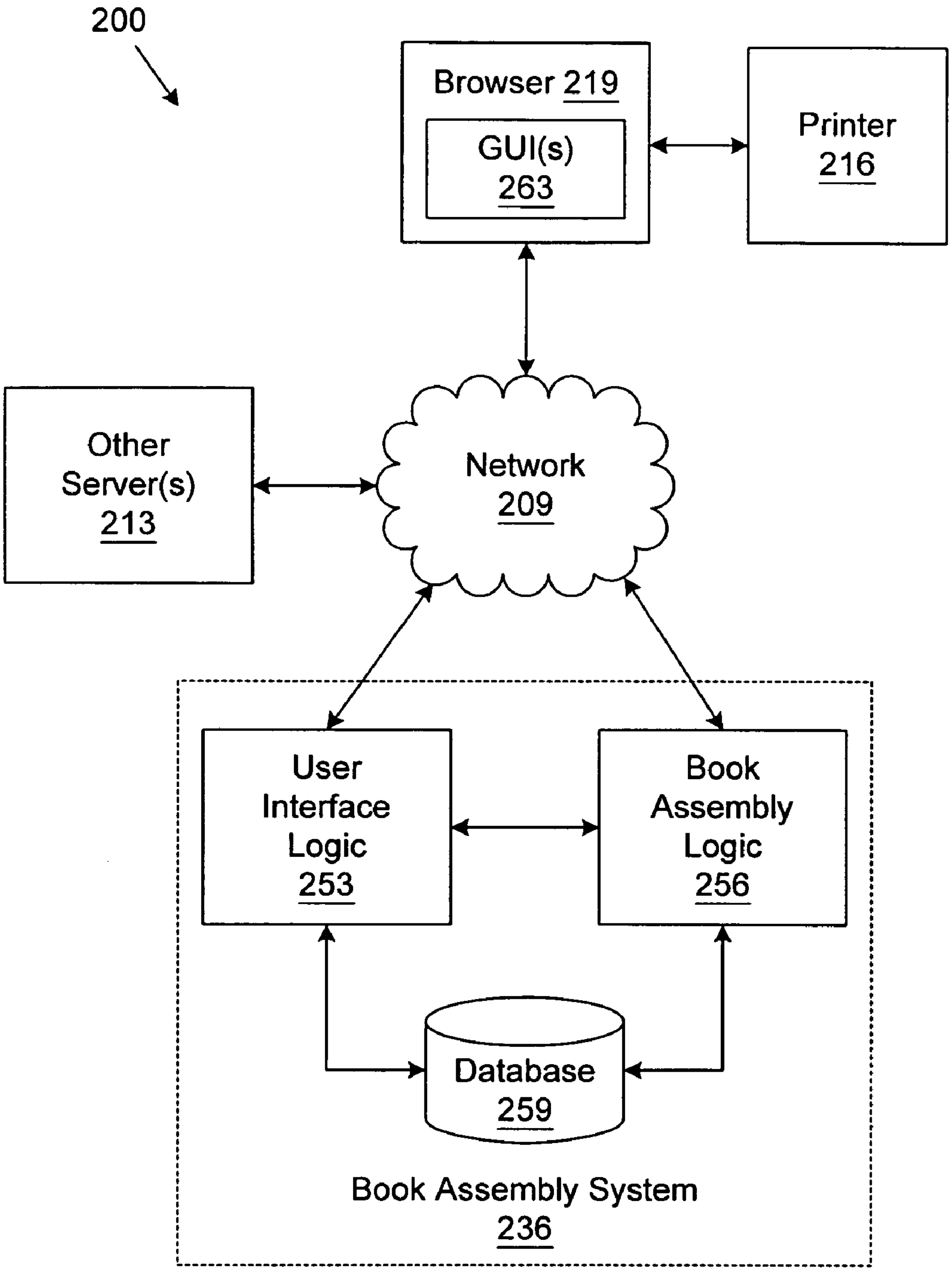
FIG. 4 is a functional block diagram of a book assembly system executed in the system of FIG. 3 to create the digital version of the picture book template of FIG. 1.

With reference to FIG. 4, shown is a functional block diagram of the picture book assembly network 200, according to the present invention. The book assembly system 236 includes user interface logic 253 and book assembly logic 256, both of which interface with a database 259. The user interface logic 253 generates graphical user interfaces 263 that are displayed on the browser 219. The graphical user interfaces 263 are created by the user interface logic 253 and supplied to the browser 219 via the network 209.

Next, a discussion of the operation of the picture book assembly network 200 is provided. To begin, a user manipulates the browser 219 in the client 206 (FIG. 3) to access the book assembly system 236 on the server 203 (FIG. 3). In this regard, for example, the user interface logic 253 may include a number of web pages that include the graphical user interfaces 263. Through the graphical user interfaces 263, a user then identifies and/or otherwise supplies the content items that are to be included in the picture book template 100 (FIG. 1). The content items may be, for example, the images 123 (FIG. 1) and/or blocks of text 126 (FIG. 1) that are to be included in the picture book template 100 (FIG. 1). The user may supply the images 123 and/or blocks of text 126 themselves, or, the user may access a number of images 123 and/or blocks of text 126 stored in the database 259 through appropriate graphical user interfaces 263 generated by the user interface logic 253.

Once the appropriate images 123 and/or text 126 are identified for a particular picture book template 100, then the book assembly logic 256 assembles the picture book template 100 in digital form. The user interface logic 253 then transmits the picture book template 100 to the browser 219 to be shown to the user via an appropriate graphical user interface 263. The user may then preview the picture book template 100 and, if it is acceptable, the user may print out the same on the printer 216.

Note that the format of the picture book template 100 that is generated by the book assembly system 236 is a digital format that allows the user to print the document from the printer 216. In this regard, the picture book template 100 may be embodied in a digital format that may be displayed by the browser 219. Alternatively, the picture book template 100 may be embodied in a digital format that is recognizable by an application that runs on the client 206 for printing. Such an application may include, for example, Acrobat™ Reader 4.0, a product that is sold by Adobe Systems, Inc. of San Jose, Calif. If the Acrobat Reader 4.0 is used, for example, the picture book template 100 is embodied in a portable document format (.pdf) as is generally known by those with ordinary skill in the art. Note that the book assembly logic 356 may obtain the images 123 and text 126 from the client 206, other servers 213, or from the database 259 to include in the picture book template 100. For example, the images 123 may be downloaded into the client 206 from a digital camera or from a portable memory device such as, for example, a floppy disk or a compact disk, etc. Also, the images 123 may be scanned by a scanner locally coupled to the client 206. Alternatively, the images 123 and the text 126 may be provided to the book assembly logic 356 having been retrieved from the client 206 via the user interface logic 253 and stored in the memory 226 (FIG. 3).

With regard to the book assembly system 236, it is understood that each block represents a module, object, or other grouping or encapsulation of underlying functionality as implemented in programming code. However, the same underlying functionality may exist in one or more modules, objects, or other groupings or encapsulations that differ from those shown in FIG. 4 without departing from the present invention as defined by the appended claims.

Figure 5:
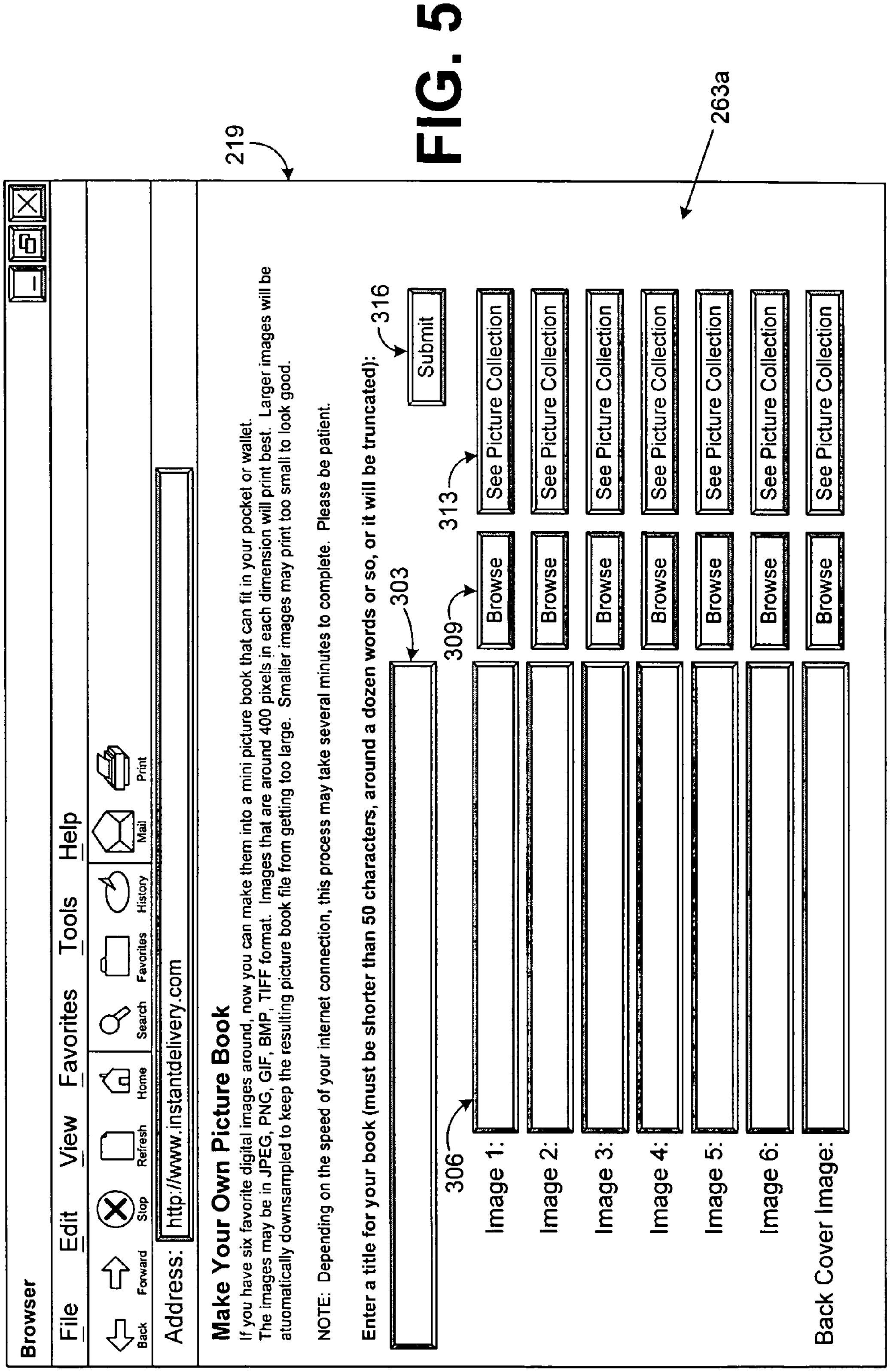
FIG. 5 is a drawing of a user input interface generated by the book assembly system of FIG. 4 and employed to obtain content items with which to create the digital version of the picture book template of FIG. 1.

With reference to FIG. 5, shown is the browser 219 with a first graphical user interface 263*a*. The first graphical user interface 263*a* is generated by the user interface logic 253 and supplied to the browser 219 in the client 206 (FIG. 3) to allow a user to input their particular selection of images 123 and text 126 to appear in the picture book template 100. Note that other graphical configurations beyond that shown in the first graphical user interface 263*a* may be employed as well. The various buttons and fields in the graphical user interface 263*a* may be manipulated by positioning a cursor appropriately with a mouse and pressing the mouse button or "enter" button appropriately as is generally known by those with ordinary skill in the art. This is referred to herein as "clicking" on a particular button, etc. Also, users may enter textual information into various fields by manipulating a keyboard or other device. Generally, the specific details regarding the manipulation of various elements of a graphical user interface are generally known by those skilled in the art and are not discussed herein.

Keeping this in mind, turning to FIG. 5, the first graphical user interface 263*a* includes a title field 303 and a number of image fields 306. The title field 303 allows a user to enter a title that is a block of text 126 that appears on the first page 116 (FIG. 1) of the picture book template 100. The first graphical user interface 263 also includes a browse button 309 that can be clicked on by the user to browse through the local memory on the client 206, such as, for example, a hard drive, or other memory device, to identify various images 123 to be included in the picture book template 100. The first graphical user interface 263*a* also includes a "see picture collection" button 313 that may be clicked on to cause a further graphical user interface to appear in the browser 219 that provides a selection of images for the user. Finally, the first graphical user interface 263*a* includes a submit button 316 that allows a user to submit the information previously entered into the first graphical user interface 263*a* to the server 203 (FIG. 3). The server 203 then operates to create the picture book template 100 by executing the book assembly logic 356 (FIG. 4).

Figure 6:
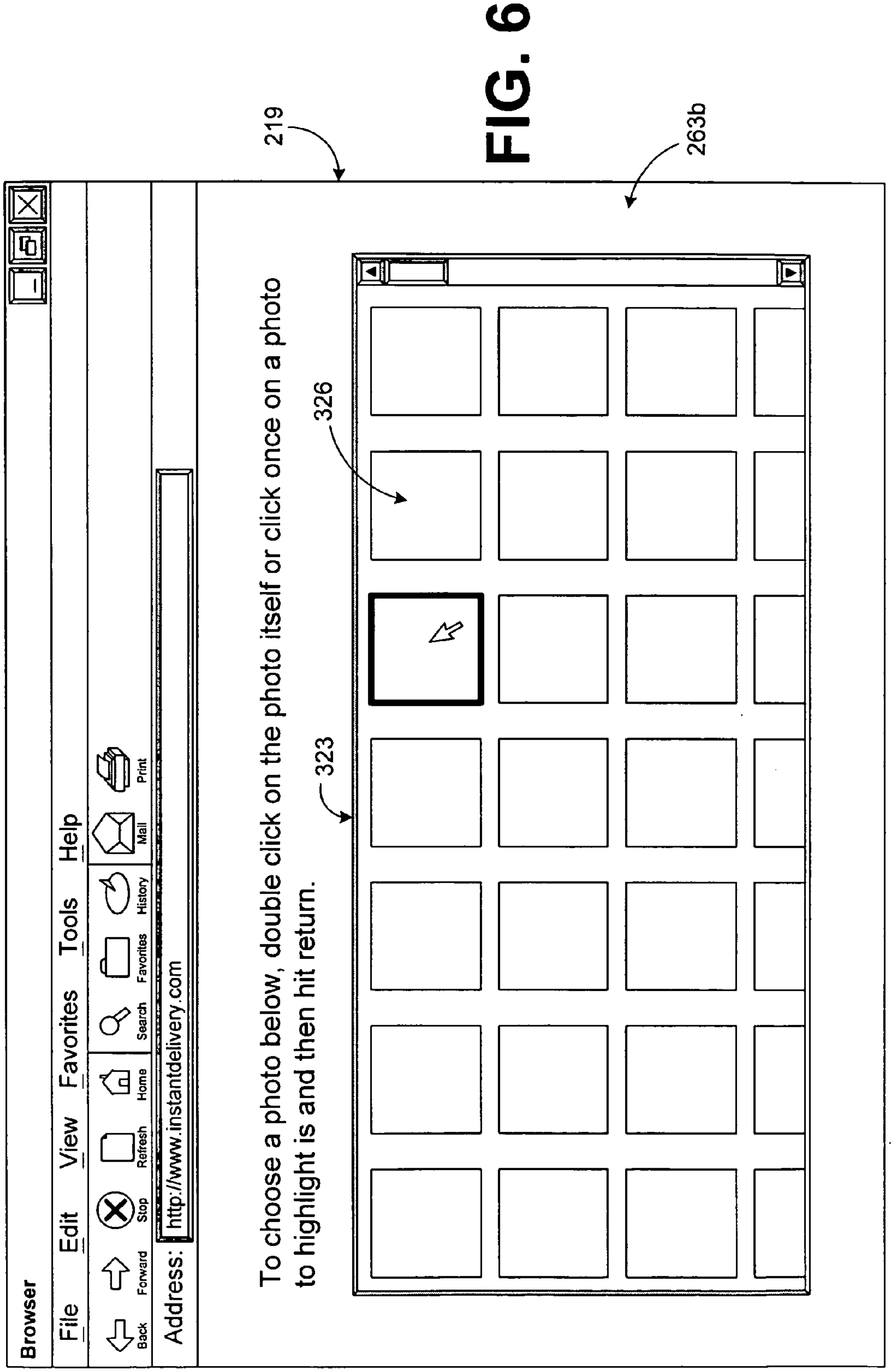
FIG. 6 is a drawing of a second user input interface generated by the book assembly system of FIG. 4 and employed to identify preexisting content items with which to create the digital version of the picture book template of FIG. 1.

With reference to FIG. 6, shown is a second graphical user interface 263*b*, according to another aspect of the present invention. The second graphical user interface 263*b* is generated by the user interface logic 253 (FIG. 4) in response to the manipulation of the "see picture collection" button 313 (FIG. 5) of the first graphical user interface 263*a* (FIG. 5). Note that other graphical configurations beyond that shown in the second graphical user interface 263*b* may be employed as well. Accordingly, the second graphical user interface 263*b* includes a picture collection 323 that displays a number of pictures 326. The user may select one of the pictures 326 to be included in the picture book template 100 by clicking on the desired picture 326. Once a particular picture 326 is selected in the second graphical user interface 263*b*, the first graphical user interface 263*a* is automatically displayed with a reference to the selected picture indicated in the image field 306. Note that the reference may be, for example, a uniform resource locator (URL), file path, or other reference.

Figure 7:
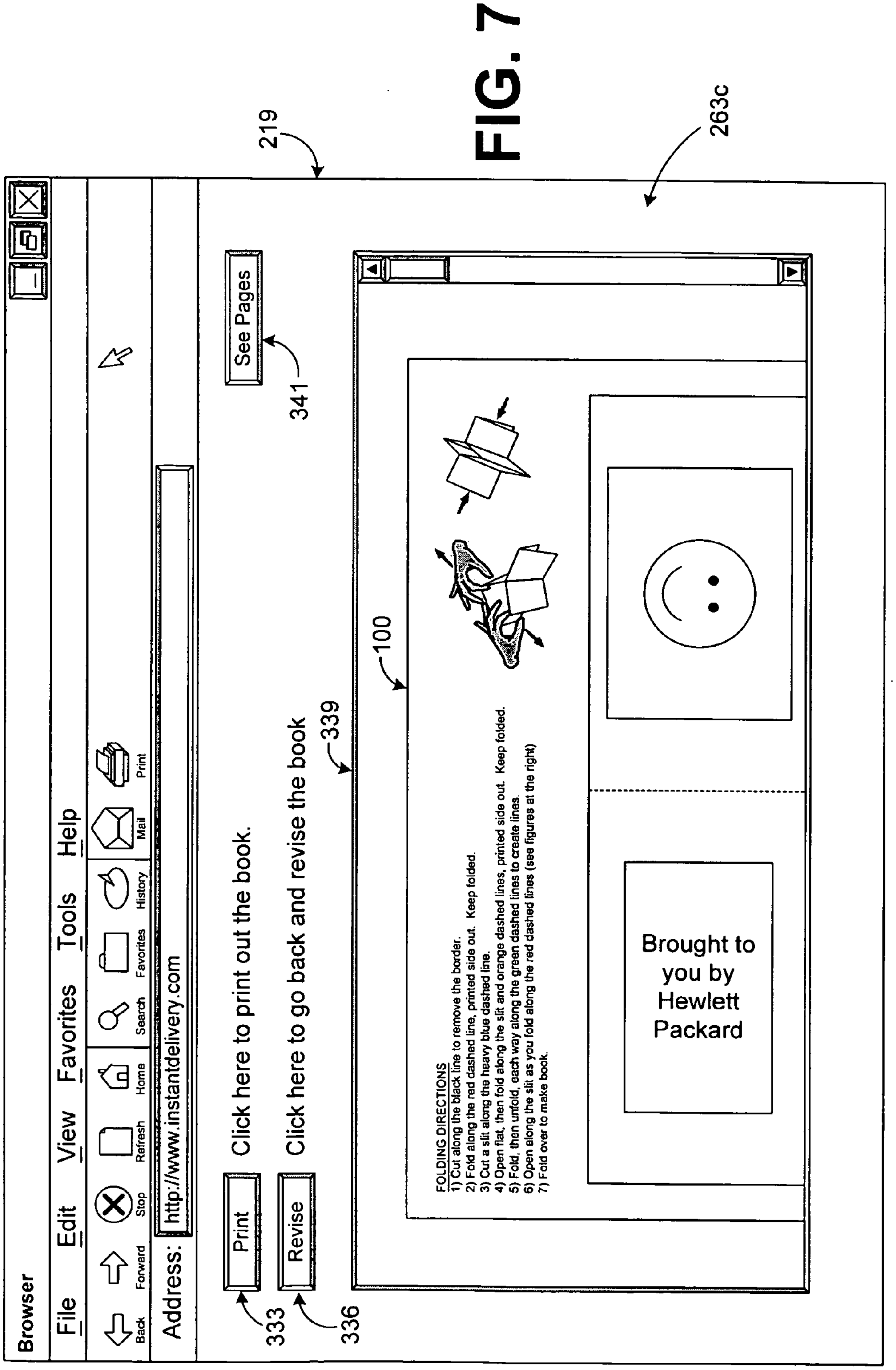
FIG. 7 is a drawing of a user interface generated by the book assembly system of FIG. 4 and employed to provide a view on a display device of the digital version of the picture book template of FIG. 1 before printing.

With reference to FIG. 7, shown is a third graphical user interface 263*c* that is employed to display a digital version of the picture book template 100 (FIG. 1) for confirmation by the user on the client 206 (FIG. 4) according to an aspect of the present invention. Note that other graphical configurations beyond that shown in the first graphical user interface 263*c* may be employed as well. The third graphical user interface 263*c* includes a print button 333, a revise button 336, and a "see pages" button 341. The third graphical user interface 363*c* also includes a viewing box 339 in which to display the digital version of the picture book template 100. The user may scroll the picture book template 100 within the viewing box 339 as shown. If the user clicks on print 333, then the picture book template book 100 is supplied to the printer 216 (FIG. 1) and printed out accordingly. If the user clicks on the revise button 336, then the first graphical user interface 263*a* is displayed where the user may alter any of the given selections that were made previously to regenerate the picture book template 100. Finally, if the user clicks on the see pages button 341, then the individual pages 116 are displayed in the viewing box 339 so that the user may determine how each page will appear in detail. Note that toggle buttons or other similar mechanism may appear after the "see pages" button 341 is clicked so that a user may toggle between pages in the viewing box 338.

Note that by clicking on the print button 333, the user causes the printing of the picture book template 100, for example, using hypertext markup language (HTML) as is generally by those skilled in the art. Alternatively, the picture book template 100 may be supplied to the client 206 in a digital format that is recognizable by an appropriate application on the client 206 that may be used to print the document on the printer 216. Such an application may include, for example, Acrobat™ Reader 4.0, a product that is provided by Adobe Systems, Inc. of San Jose, Calif. If the Acrobat Reader 4.0 is used, for example, the picture book template 100 is embodied in a portable document format (.pdf) as is generally known by those with ordinary skill in the art. If such is the case, then the particular application may be automatically executed in the client 206 upon receiving the picture book template 100 that facilitates the previewing and printing rather than displaying and printing the picture book template 100 from the browser 219.

Figure 8:
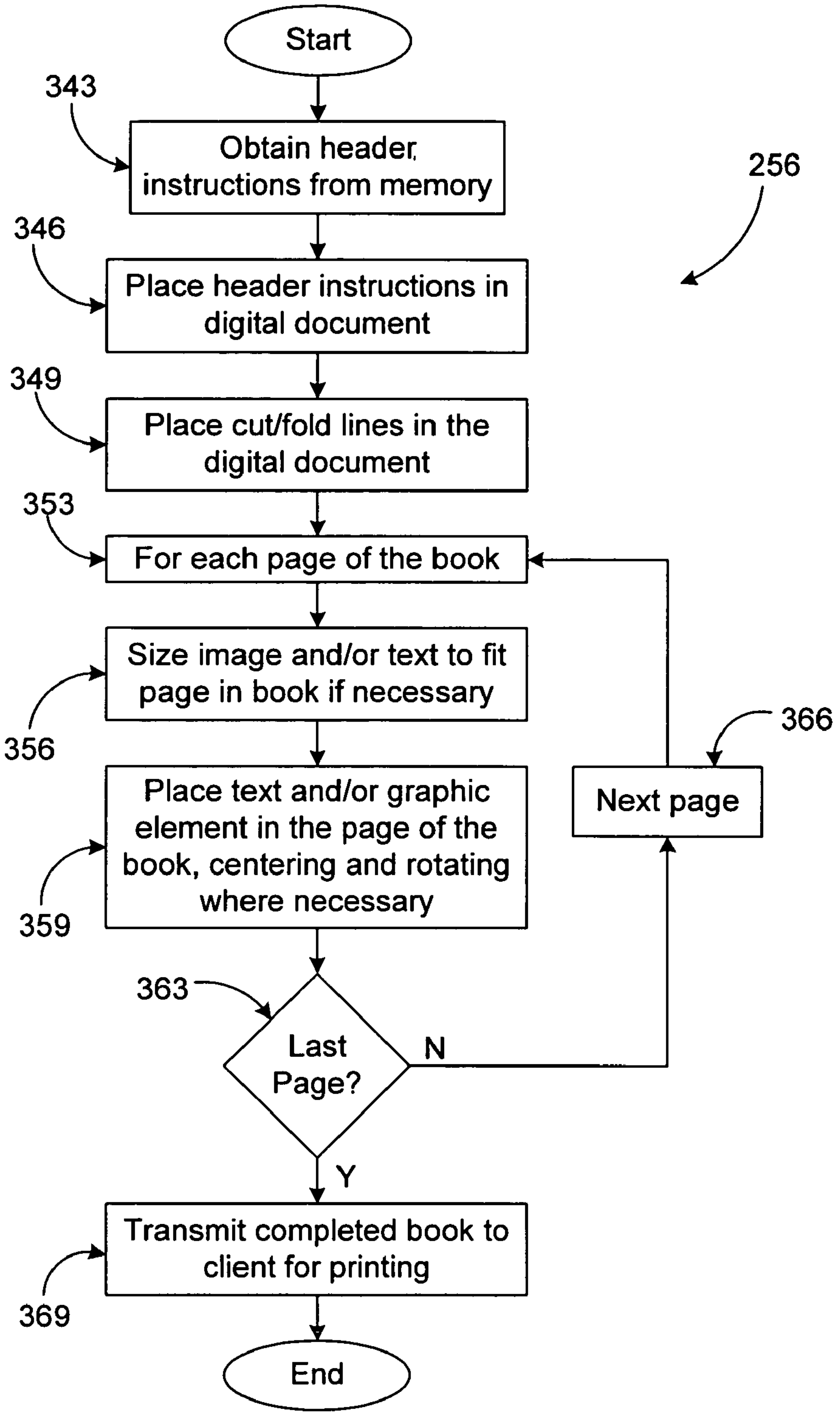
FIG. 8 is a flow chart of a book assembly logic portion of the book assembly system of FIG. 4.

With reference to FIG. 8, shown is a flowchart of the book assembly logic 256, according to an aspect of the present invention. The book assembly logic 256 is executed by the server 203 (FIG. 3) as a component of the book assembly system 236 (FIG. 3). Specifically, the book assembly logic 256 is executed to construct the picture book template 100 (FIG. 1) in a digital format that may be transmitted to the client 206 for printing. Beginning with block 343, the book assembly logic 256 obtains the instructions 109 and the graphical depiction 113 of the instructions to include in the instructions region 106. The instructions and the graphical depiction 113 are obtained, for example, from the memory 226 (FIG. 3). Thereafter the book assembly logic 256 moves to block 346 in which the header instructions 109 and the graphical depiction 113 are placed in the instructions region 106 of the picture book template 100. Thereafter, in block 349, the identifier lines 119 are placed in the picture book template 100, thereby defining the pages 116.

Then in block 353, a loop is commenced for each page 116 (FIG. 1) of the resulting picture book. Next in block 356, the image 123 (FIG. 1) and/or text 126 (FIG. 1) that is to be placed in the current page 116 is sized using various techniques that are known by those with ordinary skill in the art. This is done to ensure that the image 123 or text 126 fits in the particular page 116. If such is already the case, then the resizing is not performed in block 356. After block 356, the book assembly logic 256 moves to block 359 in which the image 123 and/or text 126 is placed in the particular page 116 of the picture book template 100. The image 123 and/or text 126 is centered and rotated as necessary. Thereafter in block 363, the book assembly logic 256 determines whether the last page has been processed by including the desired image(s) 123 and/or text 126. If not, then the book assembly logic 256 reverts back to block 366 where the next page is identified to process. Thereafter, the book assembly logic 256 reverts to block 353 to continue the loop. However, if in block 353 the last page 116 has been processed, then the book assembly logic 256 moves to block 369 in which a completed picture book template 100 is transmitted to the client 206 for printing. This may be done, for example, by supplying the picture book template 100 to the user interface logic 253 that then supplies a graphical user interface 263*c* that includes the picture book template 100 to allow the user to preview and print the picture book template 100. Alternatively, the picture book template may be supplied directly to the client 206 to be previewed and printed using an appropriate application residing on the client 206 as discussed above. Thereafter, the book assembly logic 256 ends accordingly.

Referring back to FIG. 4, although the book assembly system 236 of the present invention is embodied in software as discussed above, as an alternative the book assembly system 236 may also be embodied in hardware or a combination of software and hardware. If embodied in hardware, the book assembly system 236 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The block diagram of FIG. 4 and the flow chart of FIG. 8 show the architecture, functionality, and operation of an implementation of the various components of the book assembly system 236. If embodied in software, each block may represent a module, segment, or portion of code that comprises one or more executable instructions to implement the specified logical function(s). If embodied in hardware, each block may represent a circuit or a number of interconnected circuits to implement the specified logical function(s). In addition, although the flow chart of FIG. 8 shows a specific order of execution, it is understood that the order of execution may differ from that which is depicted. For example, the order of execution of two or more blocks may be scrambled relative to the order shown. Also, two or more blocks shown in succession in FIG. 8 may be executed concurrently or with partial concurrence. It is understood that all such variations are within the scope of the present invention. Also, the block diagram of FIG. 4 and the flow chart of FIG. 8 are relatively self-explanatory and are understood by those with ordinary skill in the art to the extent that software and/or hardware can be created by one with ordinary skill in the art to carry out the various logical functions as described herein.

Also, the book assembly system 236 can be embodied in any computer-readable medium for use by or in connection with an instruction execution system such as a computer/processor based system or other system that can fetch or obtain the logic from the computer-readable medium and execute the instructions contained therein. In the context of this document, a "computer-readable medium" can be any medium that can contain, store, or maintain the book assembly system 236 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, a portable magnetic computer diskette such as floppy diskettes or hard drives, a random access memory (RAM), a read-only memory (ROM), an erasable programmable read-only memory, or a portable compact disc.

Although the invention is shown and described with respect to certain preferred embodiments, it is obvious that equivalents and modifications will occur to others skilled in the art upon the reading and understanding of the specification. The present invention includes all such equivalents and modifications, and is limited only by the scope of the claims.

We claim:

1. A system to create a digital picture book template, comprising:

a processor circuit having a processor and a memory;

book assembly logic stored in the memory and executable by the processor, the book assembly logic comprising:

logic to obtain a number of content items to be depicted in a picture book cutout in the digital picture book template;

logic to define a number of pages of the picture book cutout with a number of identifier lines;

logic to associate at least one of the content items with at least one of the pages; and logic to associate a set of assembly instructions with the digital picture book template by positioning a graphical depiction of an assembly of a picture book from the picture book cutout in the digital picture book template, wherein the identifier lines are additionally depicted in the graphical depiction, the identifier lines as depicted in the graphical depiction corresponding to the identifier lines of the picture book cutout to aid an individual in the assembly of the picture book.

2. The system of claim 1, wherein the book assembly logic further comprises logic to transmit the digital picture book template to a client for printing.

3. The system of claim 1, wherein the logic to associate at least one of the content items with at least one of the pages further comprises logic to identify a graphical position of the at least one content item on the at least one page.

4. The system of claim 3, wherein the logic to identify a graphical position of the at least one content item on the at least one page further comprises logic to rotate the at least one content item.

5. The system of claim 3, wherein the logic to identify a graphical position of the at least one content item on the at least one page further comprises logic to resize the at least one content item to fit on the at least one page.

6. A system to create a digital picture book template, comprising:

means for obtaining a number of content items to be depicted in a picture book cutout in the digital picture book template;

means for defining a number of pages of the picture book cutout with a number of identifier lines;

means for associating at least one of the content items with at least one of the pages; and means for associating a set of assembly instructions with the digital picture book template by positioning a graphical depiction of an assembly of a picture book from the picture book cutout in the digital picture book template, wherein the identifier lines are additionally depicted in the graphical depiction, the identifier lines as depicted in the graphical depiction corresponding to the identifier lines of the picture book cutout to aid an individual in the assembly of the picture book.

7. The system of claim 6, further comprising means for transmitting the digital picture book template to a client for printing.

8. The system of claim 6, wherein the means for associating at least one of the content items with at least one of the pages further comprises means for identifying a graphical position of the at least one content item on the at least one page.

9. The system of claim 8, wherein the means for identifying a graphical position of the at least one content item on the at least one page further comprises means for rotating the at least one content item.

10. The system of claim 8, wherein the means for identifying a graphical position of the at least one content item on the at least one page further comprises means for resizing the at least one content item to fit on the at least one page.

11. A method for creating a digital picture book template in a server, comprising the steps of:

obtaining a number of content items in a server to be depicted in a picture book cutout in the digital picture book template;

defining a number of pages of the picture book cutout in the server with a number of identifier lines;

associating at least one of the content items with at least one of the pages; and associating a set of assembly instructions with the digital picture book template by positioning a graphical depiction of an assembly of a picture book from the picture book cutout into the digital picture book template, wherein the identifier lines are additionally depicted in the graphical depiction, the identifier lines as depicted in the graphical depiction corresponding to the identifier lines of the picture book cutout to aid an individual in the assembly of the picture book.

12. The method of claim 11, wherein the step of associating at least one of the content items with at least one of the pages further comprises the step of identifying a graphical position of the at least one content item on the at least one page.

13. The method of claim 12, wherein the step of identifying a graphical position of the at least one content item on the at least one page further comprises the step of rotating the at least one content item.

14. The method of claim 12, wherein the step of identifying a graphical position of the at least one content item on the at least one page further comprises the step of resizing the at least one content item to fit on the at least one page.

* * * * *